United States Patent [19]

McMaster

[11] Patent Number: 5,220,978
[45] Date of Patent: Jun. 22, 1993

[54] COOLING SYSTEM FOR JOURNALLED ROTATING SHAFT MACHINERY

[75] Inventor: Thomas M. McMaster, Bellingham, Wash.

[73] Assignee: Texaco Inc., White Plains, N.Y.

[21] Appl. No.: 658,605

[22] Filed: Feb. 21, 1991

[51] Int. Cl.$^5$ .............................................. F01M 5/00
[52] U.S. Cl. .................. 184/104.1; 184/6.22; 165/47; 165/104.21; 384/467; 384/473
[58] Field of Search ............... 184/104.1, 104.2, 104.3, 184/6.22; 384/467, 473, 476, 313, 316; 165/47, 86, 104.16, 122, 104.21

[56] References Cited

U.S. PATENT DOCUMENTS

| | | | |
|---|---|---|---|
| 1,355,652 | 10/1920 | Coppus et al. | 384/473 |
| 2,524,798 | 10/1950 | Hoskinson | 184/104.2 |
| 2,813,763 | 11/1957 | Eisenhart | 384/467 |
| 2,836,471 | 5/1958 | Luenberger | 384/467 |
| 3,180,270 | 4/1965 | Arnts et al. | 184/104.3 |
| 3,736,812 | 6/1973 | Wellauer | 184/104.1 |
| 4,270,064 | 5/1981 | Glandorf et al. | 184/104.1 |
| 4,455,099 | 6/1984 | Shibasaki | 384/473 |
| 5,022,494 | 6/1991 | Yamakage et al. | 184/104.1 |
| 5,058,496 | 10/1991 | Wittkopf | 384/467 |

FOREIGN PATENT DOCUMENTS

| | | | |
|---|---|---|---|
| 0024293 | 3/1981 | Japan | 384/467 |
| 0074391 | 3/1989 | Japan | 184/104.1 |

*Primary Examiner*—Carl D. Price
*Assistant Examiner*—Alan B. Cariaso
*Attorney, Agent, or Firm*—James J. O'Loughlin; Robert B. Burns

[57] ABSTRACT

In a rotating shaft machine having at least one shaft bearing, a lubricating system for circulating a liquid lubricant to and from the bearing. The lubricant, after engaging the bearing, flows to a reservoir containing a lubricant pool, which reservoir also embodies a heat pipe partially submerged in lubricant with at least one segment above the lubricant pool surface. A stream of air generated by a fan or other duct facility, is directed toward the exposed segment of the heat pipe whereby to cool the latter and consequently to effect heat exchange with the lubricant pool.

1 Claim, 3 Drawing Sheets

COOLING SYSTEM FOR JOURNALLED ROTATING SHAFT MACHINERY

BACKGROUND OF THE INVENTION

In rotating shaft machinery, it is necessary to lubricate the shaft supporting bearings, or journals as they are often referred to. The bearings function as the main support for the rotating shaft whether the latter be driven, or be part of a driving mechanism such as a motor or an engine.

It is normal practice in any embodiment or form of bearing, whether it be roller, sleeve or otherwise, to assure that the bearing is provided with sufficient lubricant to establish a friction resistant layer between adjacent surfaces of rubbing parts. Proper bearing lubrication will normally assure extended, efficient operation of the equipment and minimize bearing burn out. The latter could be the consequence of any failure in the lubrication system.

Lubricants can assume different forms depending on the application to which they are applied. In most instances, the lubricant will conveniently take the form of a liquid having particular characteristics. The liquid is directed into or onto the bearing in a manner to maintain the necessary interface film.

Where a liquid lubricant is utilized, the operating conditions, particularly the rotational speed of the machine or equipment, may be such that the load applied to the shaft could generate excessive heat. When the heat is sufficient to break down the lubricant, or where the lubricant does not reach the necessary bearing surfaces, the latter will soon deteriorate and hasten prompt bearing wear.

It is essential therefore that not only should lubricant flow be maintained onto a journal or bearing surface, but the lubricant must be kept within a preferred temperature range that will assure its effectiveness.

Diverse ways and methods have been utilized toward achieving effective lubricant cooling primarily by the facility of heat transfer with another medium such as oil, water, air or the like. In either instance, the lubricant is generally maintained in a reservoir communicated with, or within the bearing housing.

Heated lubricating oil which passes into the reservoir is circulated through or in contact with a heat exchange means which can be located close by, or which can be remote from the equipment. Thereafter the cooled lubricant is recirculated for reintroduction against the bearing surfaces.

In one embodiment, particularly where several bearings are involved, the lubricant holding reservoir can be maintained in a casing or housing which encloses the bearing. Further, lubricant can be delivered to the bearing surfaces in a pressurized stream by a pump rather than by way of a splash system.

It can be appreciated that rotating machinery of the type here contemplated, which is physically locationed in an area that experiences a shortage of water, can realize a negative operating factor in the bearing cooling process. This is notably true in arid and desert areas where water is in short supply, or immediately inaccessible.

BRIEF STATEMENT OF THE INVENTION

Toward overcoming operating problems imposed by a lack of satisfactory cooling to maintain heated bearings or journals at a working temperature, the present disclosure provides an improved, liquid lubricant cooling system. The flowing lubricant is maintained within a desired temperature range as a result of heat exchange with a forced stream of air, which can be generated by the machine being lubricated.

Functionally, the heated oil after dripping or flowing from a hot bearing, is conducted to, or falls into a reservoir in which a heat transfer element such as a heat pipe is located. The latter being fabricated of metal, is positioned such that at least a segment thereof is submerged in the heated lube oil. An exposed segment of the heat pipe is located where it will lie in the path of a rapidly flowing air stream such that the latter will sweep across the heat pipe exposed surfaces to effect cooling the entire heat pipe by heat transfer from the submerged segment.

It is therefore an object of the invention to provide a rotating machine lubricating system wherein bearing lubricant is temperature controlled by heat exchange with an external stream of air.

A further object is to provide a cooling system of the type contemplated wherein a stream of air, generated by the rotating equipment being lubricated, will direct a forced air stream against the surfaces of a heat exchange member.

DESCRIPTION OF THE DRAWINGS

Referring to FIG. 1, the disclosed lubricating oil cooling system is incorporated into a rotary drive motor 10, which in turn is coupled to a driven element such as a rotary pump 11. While the disclosed system can be applied to a variety of machines, its operating features will be described as applying to a turbine as the drive element. Motor 10 is comprised of an outer casing 12 mounted to a base or foundation plate 13. Casing 12 in the usual structure, encloses a rotor which terminates in a drive shaft 14 extending from one end of casing 12.

Figure 1:
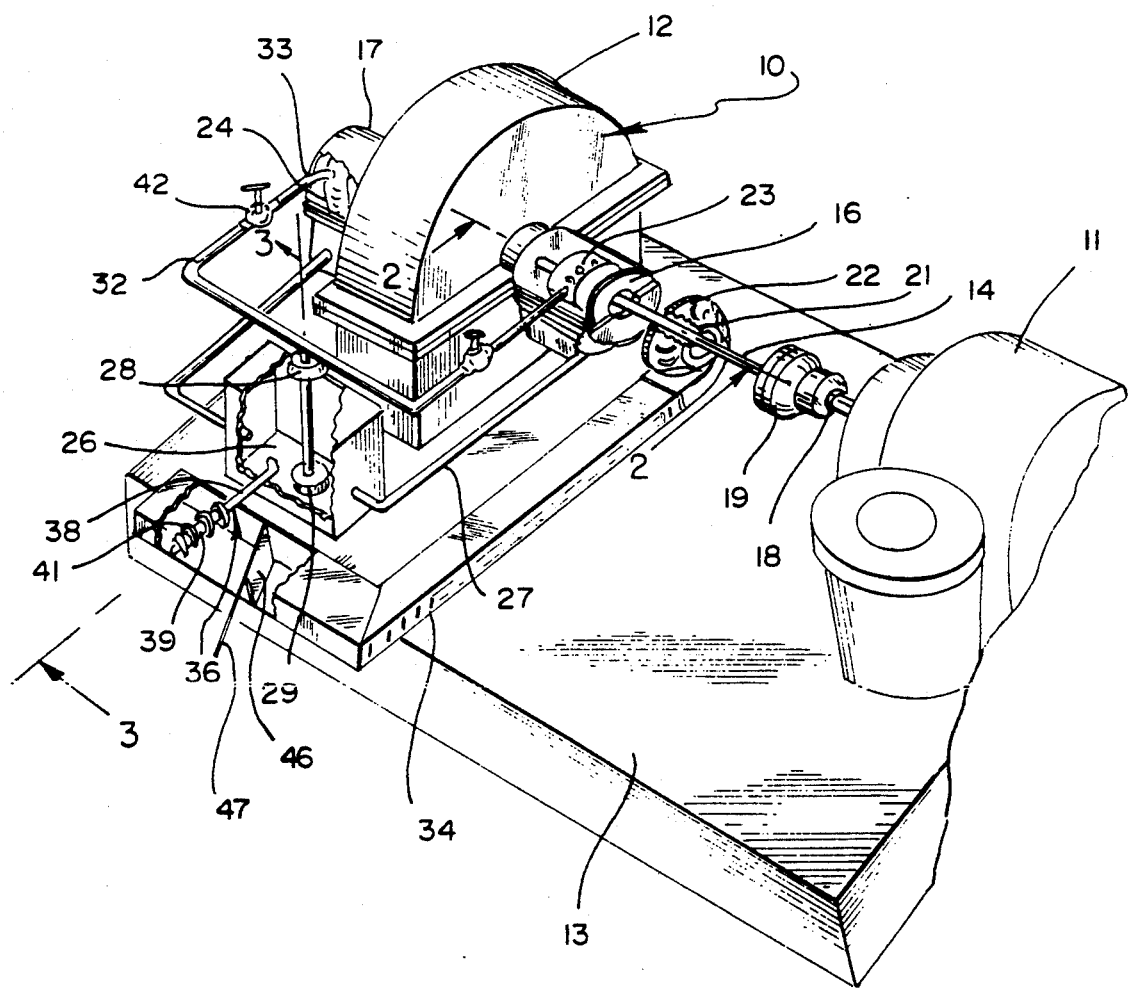
FIG. 1 is an isometric representation of the instant lube oil cooling system cooperative with the main bearings of a drive motor or turbine.
Figure 2:
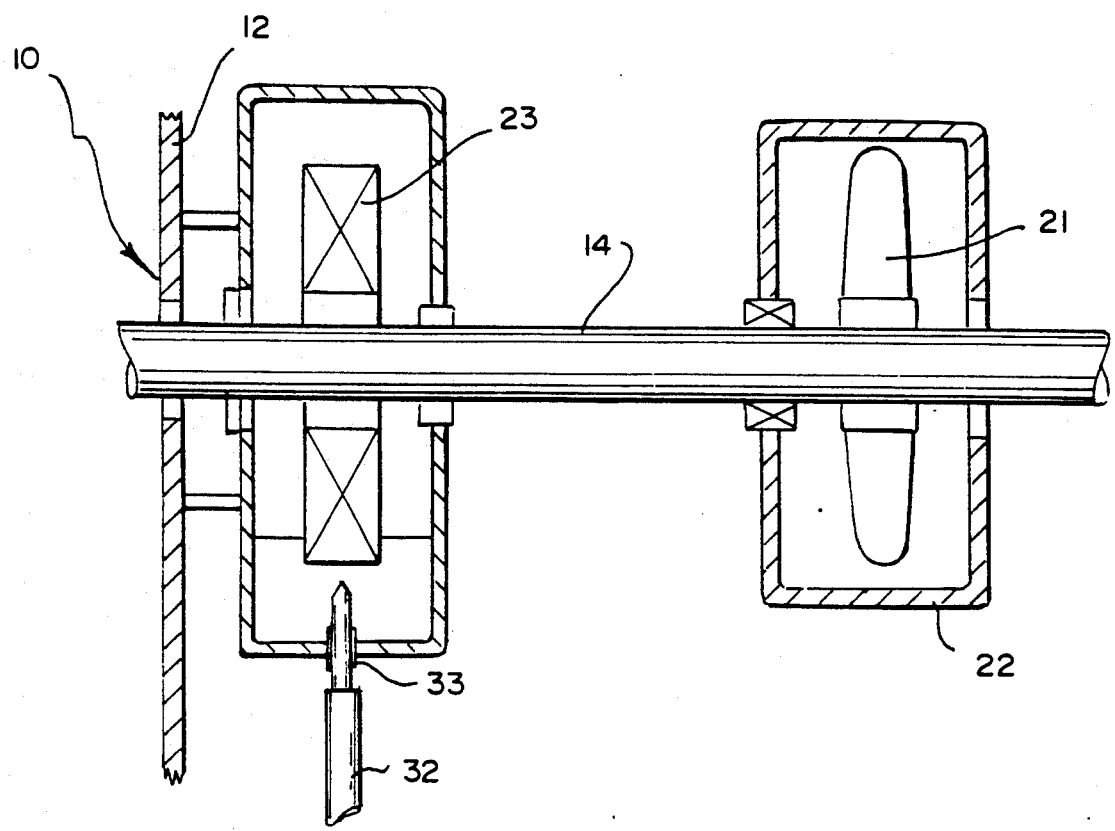
FIG. 2 is a cross-section view on an enlarged scale taken along line 2—2 in FIG. 1.

Casing 12 is provided at opposite ends with bearing housings 16 and 17 which enclose the main shaft bearings. The protruding end of drive shaft 14 is positioned in axial alignment with a second drive shaft 18 of pump 11 through a coupling 19. Shaft 14 is further provided with a fan rotor, or impeller 21 which is affixed to the shaft. A fan casing 22 encloses the fan rotor and includes a discharge port which delivers a stream of forced air into an air duct 34.

In the shown embodiment, main bearings 23 and 24 are each lubricated by lube oil which is drawn from a common reservoir 26. Each bearing housing, 16 for example, is provided with a drain line 27 formed of tubing which receives heated lube oil and directs it preferably by gravity flow into the reservoir lubricant pool 31.

Reservoir 26 is shown as receiving and holding oil from a plurality of bearing sources. It can be appreciated however that each bearing, depending on its size and the amount of heat it generates, could incorporate an individual reservoir and cooling system as will be hereinafter noted in greater detail.

Reservoir 26, receives at least one, and preferably a plurality of lube oil flows depending on the number of shaft bearings lubricated. At least one oil circulating pump 28 is positioned in the reservoir with its inlet 29 submerged in oil pool 31. The pump outlet is communicated with one or more discharge conduits or tubes 32. The latter are normally formed of metallic tubing which carries pumped lube oil to deliver a pressurized flow at or into the respective shaft bearings.

Bearings 23 for example can be splash lubricated or as shown can be directly lubricated by one or more nozzles 33 fixed into housing 16. The respective nozzles 33 are positioned to direct lubricant against bearing surfaces at the most effective points to achieve optimum lubrication.

Reservoir 26 is provided with one or more heat exchange members in the form of thermally conductive heat pipes. One embodiment comprised of heat pipe 36, extends horizontally in and from the reservoir wall. Each pipe 36 for example, comprises an end segment 38 which is submerged in lubricant pool 31. The heat pipe other end 39 extends through the reservoir side at a sealed opening, into the surrounding air to be contacted by a rapidly moving air stream.

The exposed heat pipe segment 39 is formed with a metallic wall, and is preferably provided with a series of metallic fins 41, the latter being arranged to receive maximum contact with a cooling air flow. Ideally, the heat pipe finned end 41 can be enclosed within an expanded portion of air duct 34.

Lubricant flow from the pump 28 can be regulated in response to the demand by the respective heated bearings. In one embodiment of temperature control, to maintain the lubricant within its preferred operating temperature range, flow control valving in line 32 can be utilized. Flow control valve 42 is preferably positioned at each bearing housing and is operable to regulate the volume of lubricant which is directed onto the respective bearing surface.

For a more accurate control of lube oil temperature, sensing means such as a temperature sensor 43 can be incorporated into the bearing housing 26 to monitor bearing temperature under all load conditions. In such an instance, flow control valve 42 can be manually or automatically actuated in response to variations in lubricant temperature as sensed or monitored on a continuous basis.

Control of the oil cooling is subject to regulation of the air flow which passes across the heat tube exposed end 39. This is achieved readily through use of an air deflection or other dampening mechanism such as a damper plate 46. The latter is operably positioned within air duct 34, having an exposed actuating shaft 47.

Figure 3:
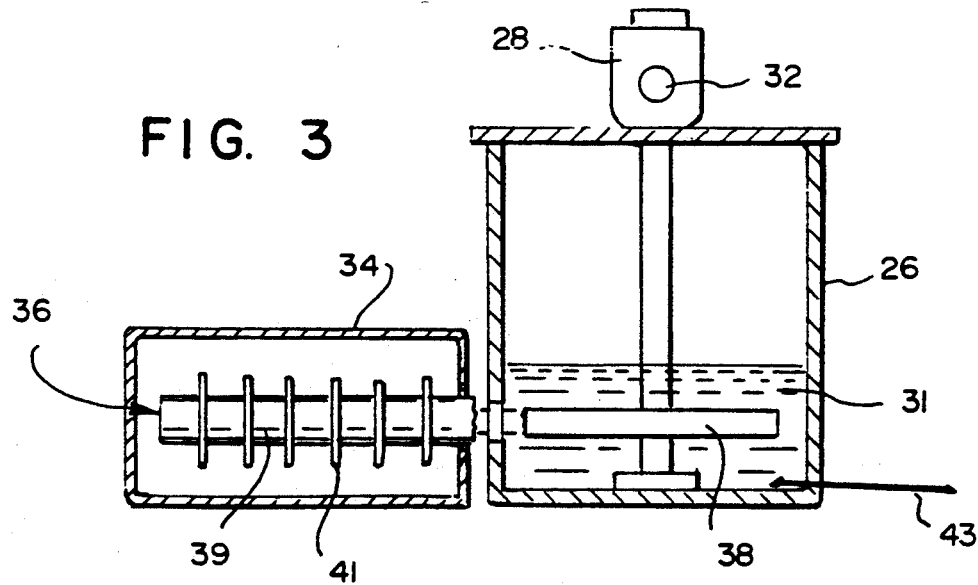
FIG. 3 is a view on an enlarged scale taken along line 3—3 in FIG. 1.

For automatic control of oil temperature in reservoir 31, a sensor such as 43 as shown in FIG. 3, can be connected to shaft 47 through a necessary linkage, not shown.

Figure 4:
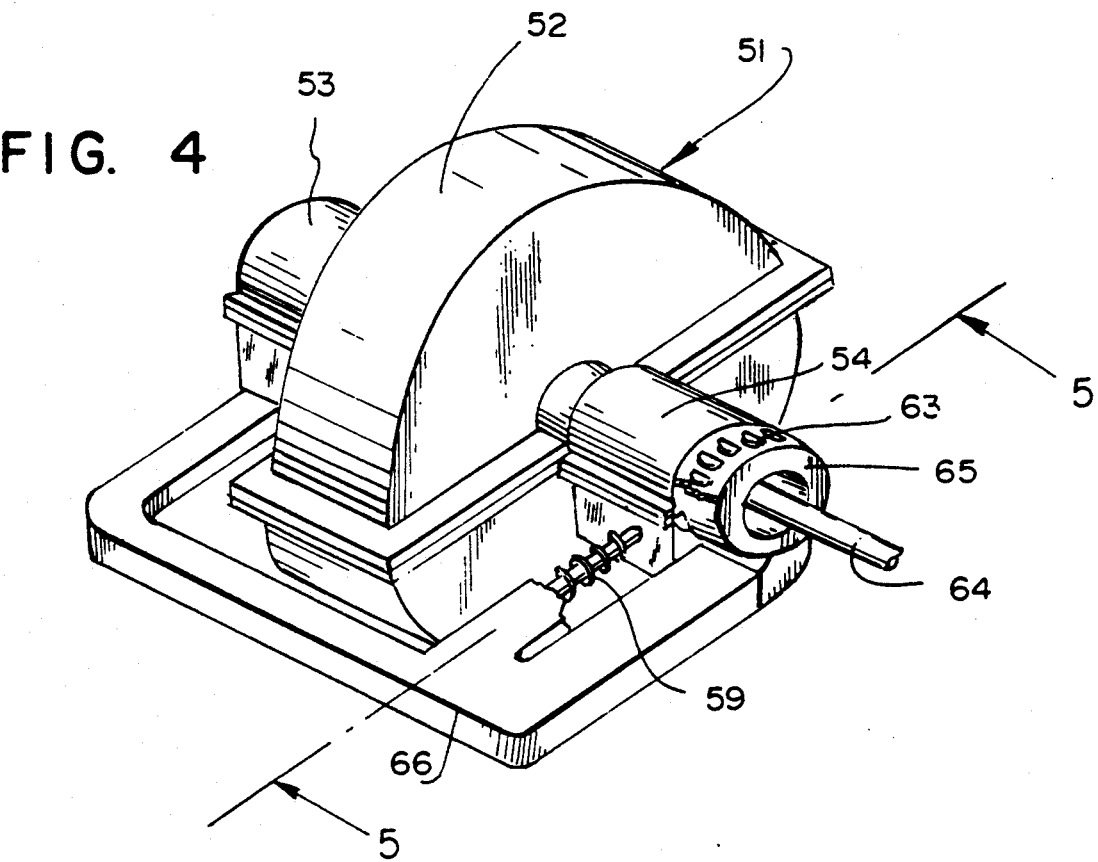
FIG. 4 is an isymetric view of an alternate embodiment of the invention.
Figure 5:
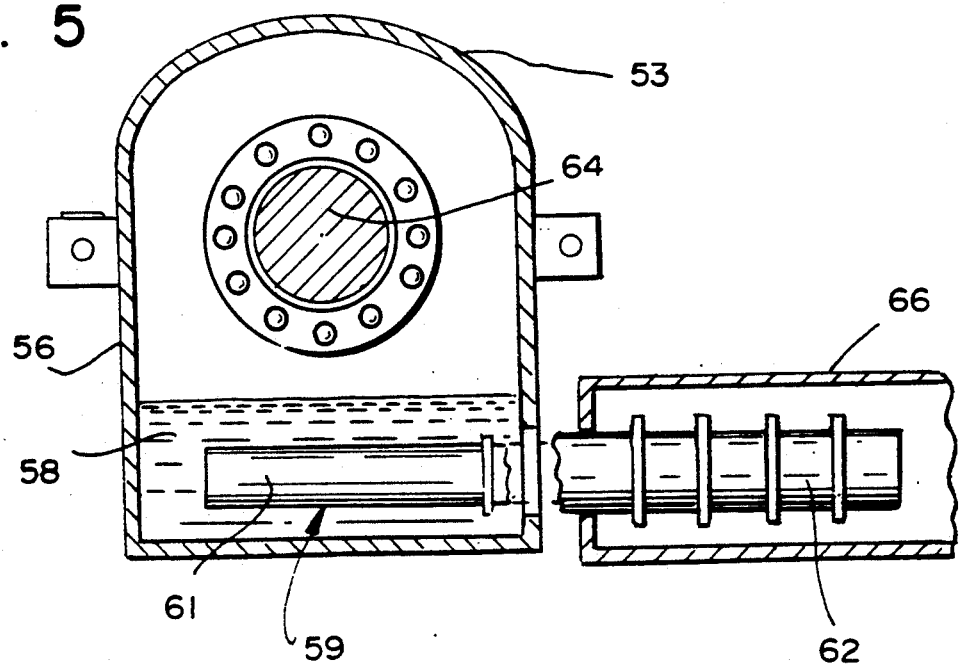
FIG. 5 is a cross-sectional view on an enlarged scale taken along line 55 in FIG. 4.

A further embodiment of the novel lubricant cooling system can be incorporated into individual bearing housings when circumstances warrant such an arrangement, rather than circulating all the lubricant through a common single reservoir. To illustrate this aspect, and referring to FIGS. 4 & 5, a drive motor or turbine 51 is shown comprised of the same basic elements as illustrated in drive motor 10 of FIG. 1.

In the present arrangement, casing 52 of motor 51 is provided with extended bearing housings 53 and 54 having the motor's main bearings enclosed therein. Lubricating oil is delivered to each bearing from a reservoir 56 at the lower side of the bearing housing.

The respective reservoirs such as 56 are not provided with drain means, but rather incorporate the lubricant within the bearing housing reservoirs themselves. Thus, lubricant oil after being splashed against a bearing by a rotating vane or the like, falls into the lubricant pool 58. A heat pipe 59 which extends through the reservoir wall 56, is provided with a first end 61 which is substantially or completely immersed into pool 58. The second or finned end 62 of heat pipe 59 extends substantially horizontally outward from the reservoir wall.

Fan 63 carried on the extended shaft 64 of the motor 51, is rotated with the drive shaft speed, thereby generating a flow of air which is confined within fan casing 64. An extension to casing 64 includes an air duct 66 which guides the forced air stream through a manifold air duct 67 thereby, directing forced air flows toward their respective heat pipe exposed ends 63 at the respective bearing housings.

The lubricant cooling air flow fan is illustrated in the foregoing examples as depending from the drive motor shaft, this concept however is not the sole embodiment of the invention. Air flow to the heat pipe exposed ends can be generated by a separate and distinct fan apparatus either driven by the motor, or driven independently thereof.

It is understood that although modifications and variations of the invention can be made without departing from the spirit and scope thereof, only such limitations should be imposed as are indicated in the appended claims.

I claim:

1. In a rotating shaft machine having at least one shaft bearing, a lubricant cooling system for said shaft bearing cooperative with said machine and including;

a housing enclosing said at least one shaft bearing, reservoir means spaced from said shaft bearing and holding a pool of lubricant, conduit means cooperative with said housing for directing cooled lubricant from said pool, onto the said shaft bearing, heat exchange means connected to said reservoir including, a thermally conductive member having a first segment immersed in the lubricant pool, a second segment of said thermally conductive member spaced from said lubricant pool, air flow inducing means engaging the shaft of said rotating shaft machine, a duct having an inlet positioned adjacent to said air flow inducing means to receive a stream of air therefrom, and having an outlet directed at the second segment of said thermally conductive member, to discharge the stream of air against said second segment, and air flow regulating means in said duct, being adjustable to regulate air flow through the duct in response to the temperature of lubricant in said pool.

* * * * *